US012778176B2

(12) United States Patent
Morend et al.

(10) Patent No.: US 12,778,176 B2
(45) Date of Patent: Nov. 3, 2026

(54) METHOD TO CHECK A COFFEE BEANS ROASTING SYSTEM

(71) Applicant: SOCIETE DES PRODUITS NESTLE S.A., Vevey (CH)

(72) Inventors: Joel Morend, Chatonnaye (CH); Flavien Florent Dubief, Champagne (CH); Thomas Rudi S. Degreef, Grimbergen (BE); Michiel Alexander Celis, Deurne (BE); Rien Denise M. Lemmens, Boechout Antwerp (BE); Maxime Baekelandt, Ghent (BE)

(73) Assignee: Société des Produits Nestlé S.A., Vevey (CH)

( * ) Notice: Subject to any disclaimer, the term of this patent is extended or adjusted under 35 U.S.C. 154(b) by 491 days.

(21) Appl. No.: 18/258,014

(22) PCT Filed: Dec. 6, 2021

(86) PCT No.: PCT/EP2021/084440

§ 371 (c)(1),
(2) Date: Jun. 16, 2023

(87) PCT Pub. No.: WO2022/135894

PCT Pub. Date: Jun. 30, 2022

(65) Prior Publication Data

US 2024/0049764 A1 Feb. 15, 2024

(30) Foreign Application Priority Data

Dec. 22, 2020 (EP) .................................... 20216278

(51) Int. Cl.
*A23N 12/12* (2006.01)
*A23F 5/04* (2006.01)
(Continued)

(52) U.S. Cl.
CPC .............. *A23N 12/125* (2013.01); *A23F 5/04* (2013.01); *B01D 46/0032* (2013.01);
(Continued)

(58) Field of Classification Search
CPC .... A23N 12/125; A23N 5/04; B01D 46/0032; B01D 53/02; B01D 53/30; B01D 2253/102; B01D 2257/708; B03C 3/011
See application file for complete search history.

(56) References Cited

U.S. PATENT DOCUMENTS 1,547,655 A 7/1925 Johnston
4,701,193 A * 10/1987 Robertson .......... B01D 46/4245 96/380
(Continued)

FOREIGN PATENT DOCUMENTS

CN 202653129 1/2013
CN 108552559 9/2018
(Continued)

*Primary Examiner* — Mohamed Barakat
(74) *Attorney, Agent, or Firm* — Thorpe North & Western, LLP

(57) ABSTRACT

The invention concerns a method to check a roasting system (10), said system comprising: —a roasting apparatus (2), said apparatus producing smoke, and—a smoke treating unit (3) configured to treat the flow of smoke produced by the roasting apparatus and comprising: at least one smoke filtering device (221, 222, 223), a dismountable smoke collecting device (21) at least one temperature sensor (24) configured to measure the temperature T of the flow of smoke inside the smoke treating unit (3), a smoke driver (23) configured to drive smoke from the roasting apparatus (2) through said smoke treating unit, wherein the method comprises the steps of: —operating the roasting apparatus in order to produce hot gas, —monitoring the temperature of the smoke, and—observing at least one behaviour of the monitored temperature along time, —comparing said at least
(Continued)

one observed behaviour of the monitored temperature with a predetermined behaviour of temperature corresponding to the presence of the dismountable smoke collecting device (21) inside the smoke treating unit, —if the at least one observed behaviour diverges from the corresponding predetermined behaviour, then displaying an alarm.

12 Claims, 5 Drawing Sheets

(51) Int. Cl.

| | |
|---|---|
| ***B01D 46/00*** | (2022.01) |
| ***B01D 53/02*** | (2006.01) |
| ***B01D 53/30*** | (2006.01) |
| ***B03C 3/011*** | (2006.01) |

(52) U.S. Cl.

CPC ............. *B01D 53/02* (2013.01); *B01D 53/30* (2013.01); *B03C 3/011* (2013.01); *B01D 2253/102* (2013.01); *B01D 2257/708* (2013.01)

(56) References Cited

U.S. PATENT DOCUMENTS

| | | | |
|---|---|---|---|
| 9,301,543 B2 | 4/2016 | Ludwig | |
| 10,278,406 B2 * | 5/2019 | Yamamoto | A23F 5/04 |
| 10,517,422 B2 * | 12/2019 | Tan | A23N 12/125 |
| 2004/0074400 A1 | 4/2004 | Song | |
| 2008/0089986 A1 | 4/2008 | Song | |
| 2009/0130277 A1 | 5/2009 | Bressner et al. | |
| 2009/0144015 A1 | 6/2009 | Bedard | |
| 2013/0276637 A1 | 10/2013 | Stordy et al. | |
| 2016/0295906 A1 * | 10/2016 | Jacobsen | A23L 5/34 |
| 2019/0200798 A1 | 7/2019 | Fleischmann | |
| 2019/0373940 A1 * | 12/2019 | Voges | B65B 69/0041 |
| 2020/0045988 A1 * | 2/2020 | Jolliff | F23G 7/07 |
| 2022/0032226 A1 * | 2/2022 | Tubergen | B01D 47/06 |

FOREIGN PATENT DOCUMENTS

| | | |
|---|---|---|
| CN | 108634354 | 10/2018 |
| JP | H05211840 | 8/1993 |
| JP | H10165099 | 6/1998 |
| JP | 2009508529 | 3/2009 |
| JP | 2021007363 | 1/2021 |
| KR | 20020016227 | 3/2002 |
| KR | 101104180 | 1/2012 |
| KR | 200469458 | 10/2013 |
| KR | 20190058106 | 5/2019 |
| KR | 20200107541 | 9/2020 |
| RU | 2461815 | 9/2012 |
| WO | 9923888 | 5/1999 |
| WO | 2007038113 | 4/2007 |
| WO | 2020033469 | 2/2020 |
| WO | 2020084134 | 4/2020 |
| WO | 2020112951 | 6/2020 |

* cited by examiner

METHOD TO CHECK A COFFEE BEANS ROASTING SYSTEM

CROSS REFERENCE TO RELATED APPLICATIONS

The present application is a National Stage of International Application No. PCT/EP2021/084440, filed on Dec. 6, 2021, which claims priority to European Patent Application No. 20216278.0, filed on Dec. 22, 2020, the entire contents of which are being incorporated herein by reference.

FIELD OF THE INVENTION

The present invention relates to relates to apparatuses for roasting coffee beans in a safe environment.

BACKGROUND OF THE INVENTION

The roasting of coffee beans is a well-known process. The main steps consists in heating the beans to a desired roasting level and then cooling or quenching the heated beans to stop the roasting. During heating, smoke is emitted. This smoke contains safe and desired components all together, in particular the usual roasted coffee aroma, but also undesired less safe volatile organic compounds (VOC) VOC such as pyridine, 2-furane methanol, caffeine furfural, formaldehyde, acetaldehyde, . . . and particulate matter ($PM_{2.5}$, $PM_{10}$), . . . .

When roasting is implemented in manufacturing places producing important quantities of roasted beans, generally all the conditions for catching unsafe components are supplied. But, there is a recent trend to implement small batch roasting with small roasters in shops, restaurants and coffees where customers are able to consume coffee brewed from freshly roasted beans. The roaster does not only provide freshness and theater advantages, but also dispenses the pleasant roasted coffee aroma inside the shop or coffee.

Yet, as mentioned above, harmful components are emitted too. When the roaster is used in a closed environment like a shop, coffee or restaurant, the emission of some components can become harmful depending on the size of the room, the ventilation of the room, . . . . For people working several hours in the room, smelling the smokes of the roaster can lead to a health problem.

As a result, in such an environment, it is recommended to stop the emission of smoke from the roaster to avoid any healthy issue for people present in the shop. Various types of smoke treating units exist; they can consist in destroying contaminants, such as an afterburner enabling thermal oxidation of contaminants or a catalytic afterburner or in retaining contaminants inside the apparatus like mechanical filters (metallic sieves or paper filter), an active carbon filter or an electrostatic precipitator or combination thereof.

Generally, a connecting device such as a duct is supplied to collect the smoke produced at the outlet of the roaster and to drive said smoke through the filter device(s) of the smoke treating unit. This duct requires regular cleaning because it is positioned upstream the filtering device(s) and greasy deposits stick to the internal walls.

During cleaning maintenance, this duct is dismounted and washed and then re-installed inside the smoke treating unit. Yet, the operator may forget to re-install this duct or a part of this duct for different reasons: the duct can be made of several dismountable pieces, some of these pieces can be particularly small, the operator may not be a trained person, the duct may be covered by external panels that prevent the operator to do a final check before operating the system.

If the duct is missing, during the first roasting operation after maintenance, produced smoke will enter the room without filtration. Although there is minimal user hazard from the emissions of one roast, and the failure will quickly be detected due to the excessive smoke in the room, this is not acceptable in a place like a shop, café or restaurant.

It is necessary to warn the operator as early as possible so that he/she is able to stop the roasting operation and is able to re-install the duct and re-start the operation.

SUMMARY OF THE INVENTION

An object of the invention is to address the above existing problem.

In particular, an object of the invention is to address the problem of informing the operator that a part of the collecting duct of the smoke filter is absent.

It would be advantageous to provide a method to enable the roasting operator to be informed of the absence of the duct or a part of the duct without adding sensors specific to that duct.

In a first aspect of the invention, there is provided a method to check a roasting system, said system comprising:

- a roasting apparatus, said apparatus producing smoke during the heating of coffee beans, and
- a smoke treating unit configured to treat the flow of smoke produced by the roasting apparatus, said smoke treating unit comprising:
  - at least one smoke filtering device,
  - a dismountable smoke collecting device configured to collect smoke from the outlet of the roasting apparatus
  - at least one temperature sensor configured to measure the temperature T of the flow of smoke inside the smoke treating unit,
  - a smoke driver configured to drive smoke from the roasting apparatus through said smoke treating unit, wherein, during a roasting operation implemented in the roasting apparatus, the method comprises the steps of:

- operating the roasting apparatus in order to produce hot gas,
- monitoring the temperature of the smoke during the operation, and
- observing at least one behaviour of the monitored temperature along time,
- comparing said at least one observed behaviour of the monitored temperature with a predetermined behaviour of temperature corresponding to the presence of the dismountable smoke collecting device inside the smoke treating unit,
- if the at least one observed behaviour diverges from the corresponding predetermined behaviour, then displaying an alarm.

The method relates to the roasting of coffee beans by means of a system that comprises two apparatuses: first, the roasting apparatus in which beans are heated to be roasted and, secondly, the smoke treating unit configured to treat the smoke generated inside the first roasting apparatus during the roasting of the coffee beans.

The two apparatuses can be sub-parts of one single main system or alternatively, the two apparatuses can be conceived as separated modules cooperating together during the process of roasting.

Any type of roasting apparatus can be used. In the roasting apparatus, coffee beans are heated and preferably mixed to homogenise heating through the beans.

The source of heating can be a burner (meaning combustion) fed by natural gas, liquefied petroleum gas (LPG) or even wood. Alternatively the heat source can be an electrical resistor, a ceramic heater, a halogen source, a source of infrared or of microwaves.

Preferably the source of heating is electrically powered so that the air contaminants produced during the roasting are contaminants generated from the heating of coffee beans themselves only and not from the burning of gases as it happens when the source of heating is a gas burner using natural gas, propane, liquefied petroleum gas (LPG) or even wood.

The mixing of the beans during the roasting operation can be obtained with a fluidic bed of hot air or mechanically with stirring blades or a rotating drum.

Preferably the roasting apparatus is hot air fluid bed chamber. Within such a chamber, heated air is forced through a screen or a perforated plate under the coffee beans with sufficient force to lift the beans. Heat is transferred to the beans as they tumble and circulate within this fluidized bed.

Alternatively the roasting apparatus can be a drum chamber wherein the coffee beans are tumbled in a heated environment. The drum chamber can consist of a drum rotating along a horizontal axis or the drum chamber can comprise stirring blades to tumble the coffee beans in a heated environment.

The roasting apparatus comprises an outlet from which smoke produced during the roasting operation can be evacuated.

The smoke treating unit treats the smoke in order to reduce or eliminate harmful contaminants the smoke contains.

This smoke treating unit can comprise at least one filtering device configured for filtering particulate matters or PM, volatile organic compounds or VOCs and/or hydrocarbons. Preferably, the smoke treating unit comprises at least one filtering device in the list of: a high efficiency particulate accumulator filter, a metallic filter, an electrostatic precipitator, an active carbon filter, paper filter, cotton, cloth. Optionally, the smoke treating unit can comprise additional filtering devices like wet-scrubbers, catalytic converters, afterburners.

Filters configured for trapping VOCs are preferably active carbon filter or charcoal filter. Preferably the smoke treating unit comprises several filters depending on their ability to retain specific contaminants.

The smoke is driven inside the smoke treating unit and the filtering devices by means of a smoke driver configured to circulate smoke through the smoke treating unit from the smoke collecting device to an outlet of the smoke treating unit. At the outlet, the smoke can be safely released inside the atmosphere of a room since the contaminants have been trapped.

The smoke driver is generally a fan driving the smoke to the outlet.

Preferably the fan is positioned next to the outlet of the smoke treating unit. As a result, the fan is not contaminated by the non-treated smoke and its maintenance is easier.

The smoke treating unit of the system comprises a smoke collecting device configured to collect smoke from the outlet of the roasting apparatus and lead the smoke to the filtering devices. Usually this smoke collecting device cooperates with the smoke outlet of the roasting apparatus. This smoke collecting device is removable from the smoke treating unit for maintenance, and in particular cleaning. Due to its upstream position inside the smoke treating unit, it is the first part in contact with the hot smoke emitted by the roaster and rapidly becomes the dirtiest part of the smoke treating unit.

This collecting device can comprise an air inlet device configured to mix the smoke produced by the roasting apparatus with ambient air in order to control the temperature of the smoke flowing through the smoke filtering sub-unit. This control of the temperature can be necessary when the operational efficiency of some of the filtering devices of the smoke treating unit depends directly on a range of temperature. For example that is the case for an active carbon filter which is preferably operated at a temperature below 60° C.

When the collecting device comprises an air inlet device, ambient air can be taken directly from the room where the system is installed.

Usually, this dismountable collecting device comprises several dismountable sub-elements which when assembled together form the collecting device. In particular, the collecting device can comprise the following sub-elements: an adapter for the roasting apparatus, elbow(s) and straight duct(s), the above mentioned air inlet device, adapter(s) for attaching said pieces one to the others.

The smoke treating unit comprises at least one temperature sensor configured to measure the temperature T inside the smoke treating unit.

Preferably this temperature sensor is positioned downstream the collecting device according to the direction of the flow of smoke inside the smoke treating unit.

The temperature sensor can be any sensor configured to measure a temperature. This sensor can be configured for the measure of temperature only or this sensor can be a multi-sensor component able to measure various other parameters than temperature like humidity, pressure, VOCs content. Examples of such sensors are air or gas sensors.

In order to check the roasting system and in particular the presence, by default the absence, of the connecting device, the method comprises the steps of:

- operating the roasting apparatus in order to produce hot gas,
- monitoring the temperature of the smoke during the operation, and
- observing at least one behaviour of the monitored temperature along time,
- comparing said at least one observed behaviour of the monitored temperature with a predetermined behaviour of temperature corresponding to the presence of the dismountable smoke collecting device inside the smoke treating unit,
- if the at least one observed behaviour diverges from the corresponding predetermined behaviour, then displaying an alarm.

It has been observed that when hot smoke of the roasting apparatus or any other hot gas, in particular hot air, is passed in the smoke treating unit that, is fully operable, the temperature inside the smoke treating unit rises rapidly from the beginning of this operation. On the contrary, if the removable collecting device is not positioned inside the smoke filtering unit, it has been observed that the rate of rise of temperature is far lower at the beginning of this operation.

Consequently, by observing at least one behaviour of the monitored temperature along time and comparing that behaviour with a predetermined behaviour, the risk that the removable collecting device is not present is high and a corresponding alarm can be displayed to request the operator to check the presence of the collecting device inside the smoke treating unit.

By behaviour of the monitored temperature along time, it is meant a parameter directly linked to temperature or a function of the monitored temperature.

The step of operating the roasting apparatus in order to produce hot gas can be a coffee beans roasting operation, an operation of pre-warming of the roasting apparatus or an operation of checking after an operation of maintenance of the smoke treating unit.

Whatever the operation, hot gas is produced by operating the heating means of the roasting apparatus. If coffee beans are present in the chamber, the hot gas will be the smoke produced by the heating of the beans. If no coffee beans are present in the chamber, the hot gas will be hot air. That can happen during an operation of pre-warming of the roasting system or an operation of checking of the roasting system, for example after a maintenance operation, such as a cleaning operation of the smoke collecting device.

The pre-warming is a heating operation implemented with the roasting apparatus void of beans and configured to bring the roasting apparatus at an optimal operating temperature before starting a roasting of beans.

Usually, when the method is applied while operating a coffee beans roasting operation, this roasting operation is the first operation after a maintenance operation of the dismountable smoke collecting device.

Indeed, it is important to know from the first operation implemented after a cleaning or maintenance operation of the smoke treating unit that at least a part of the smoke collecting device is absent.

In addition, the method is all the more efficient if the smoke treating unit is at ambient temperature at the beginning of the step of monitoring the temperature. The operator can be immediately informed of the absence of a part of the smoke collecting device and can be prevented from launching a new roasting operation without having checked, and if necessary re-installed, the smoke collecting device inside the smoke filtering unit.

The behaviour of the monitored temperature that is observed can be of different types.

In one simplest mode of the method:

- the observed behaviour of the monitored temperature is the temperature along time, and
- the temperature monitored at at least one time $t_0$ is compared to a pre-determined temperature $T_0$ associated to that time $t_0$, and
- if the temperature T at time $t_0$ is inferior to the pre-determined temperature $T_0$ then the alarm is displayed.

In another preferred mode,

- the observed behaviour of the monitored temperature is the rate of rise $$R = \frac{dT}{dt}$$

of the monitored temperature, and

- the rate of rise R of the monitored temperature is calculated at at least one time $t_0$ and compared to a pre-determined rate of rise $R_0$ associated to that time $t_0$, and
- if the calculated rate of rise R at time $t_0$ is inferior to the pre-determined rate of rise $R_0$ then the alarm is displayed.

In general, compared to the simple difference of temperatures, the rates of rise present the advantage of being less prone to environmental conditions, to the roasting profile applied to the coffee beans during the roasting operation or even to the fact that some previous roasting operations have already heated the filtering device.

Another advantage is that the analysis of the rate of rise enables an earlier detection of the missing filtering device and the roasting operation can be stopped immediately before the peak of VOCs and PMs appear.

When the step of operating the roasting apparatus in order to produce hot gas is a coffee beans roasting operation, then preferably, the rate of rise is calculated at a time that is before the time the peak of emissions of VOCs and PMs of the beans happens. This moment can vary depending on the type of beans roasted in the roasting apparatus such a green beans or partially pre-roasted beans that is beans having been obtained by heating green coffee beans and stopping said heating process before the end of the first crack.

Before the moment the peak of emissions happens, the difference of rates of rise of the temperature is particularly emphasized between a situation where the collecting device is present and where the collecting device is absent.

Advantageously, the roasting can even be stopped and re-started after installation of the missing collecting device.

Usually the pre-determined temperature $T_0$ associated to the time $t_0$ and the pre-determined rate of rise $R_0$, to which the temperature at time $t_0$ or the rate of rise R at to is compared, are set based on experimental data. They are usually linked to the type of smoke filtering unit, the design of the collecting device, such as the internal path for smoke in the collecting device and up to the temperature sensor, the material the smoke filtering unit is made of, the position of the temperature sensor and in particular the presence of filtering devices upstream this temperature sensor at which temperature is monitored.

In one embodiment, the system comprises:

- several smoke treating units, each of said smoke treating units being configured to conduct and treat at least a part of the smoke through a dedicated path, and
- an inlet ducting device to guide smoke emitted by the at least one roasting apparatus to at least one of the smoke treating units.

Within this embodiment, the system comprises several smoke treating units able to treat the smoke of at least one roasting apparatus. Each smoke treating unit defines a specific path for smoke defines by ducting means and including a specific collecting device. One temperature sensor per smoke treating unit can be used to provide information about each collecting device.

In another embodiment, the system comprises:

- several roasting apparatuses, and
- the smoke treating unit is configured to be able to treat the flows of smoke produced by said roasting apparatuses, said smoke treating unit comprising several dismountable smoke collecting device, each of dismountable smoke collecting device being configured to collect smoke from the outlet of one respective roasting apparatus.

In this embodiment, preferably, the method comprises the additional steps of:

- obtaining information relative the number of operated roasters,
- obtaining the predetermined behaviour of temperature corresponding to the presence of all the dismountable smoke collecting devices between said obtained number of operated roasters and the smoke treating unit, comparing the observed behaviour of the monitored temperature with said obtained predetermined behaviour of temperature corresponding to the presence of all the dismountable smoke collecting devices.

In a second aspect, there is provided a system for roasting coffee beans, said system comprising:

a roasting apparatus, and a smoke treating unit configured to treat the smoke produced by the roasting apparatus, said smoke treating unit comprising:

a dismountable smoke collecting device configured to collect smoke from the outlet of the roasting apparatus a temperature sensor configured to measure the temperature T of the flow of smoke inside the smoke treating unit, a smoke driver configured to drive smoke from the roasting apparatus through said smoke treating unit, a control system operable to perform the method described above.

Preferably, the roasting apparatus can comprise a display unit in order to display an alarm such as the requirement to check the presence of the collecting device. The display can be visual and/or a sound.

Preferably, the smoke treating unit can comprise at least one other filtering device than the active carbon filter. This other filtering device can be comprised in the list of: a high efficiency particulate accumulator filter, a metallic filter, an electrostatic precipitator, paper filter, cotton, cloth. Optionally, the smoke treating unit can comprise additional filtering devices like wet-scrubbers, catalytic converters, afterburners.

Preferably, the smoke filtering sub-unit comprises successively, according to the direction of the flow of the smoke inside the smoke treating unit, at least one filter to remove particulate matters and then an electrostatic precipitator and then the active carbon filter. This order prevents the active carbon filter from being clogged by particulate matters.

The smoke is driven inside the smoke treating unit and the different filters by means of the smoke driver configured to circulate smoke through the smoke treating unit from the inlet to the outlet of the smoke treating unit. At the outlet, the treated flow can be safely released inside the atmosphere of a room since the smoke and the contaminants have been trapped.

The smoke driver is generally a fan driving the smoke to the outlet.

Preferably the fan is positioned next to the outlet of the smoke treating unit. As a result, the fan is not contaminated by the non-treated smoke and its maintenance is easier.

According to one preferred embodiment, the smoke filtering sub-unit comprises at least successively:

a metallic mesh, then an electrostatic precipitator, and then the active carbon filter according to the movement of the flow of the smoke inside the smoke treating unit.

Preferably within this embodiment, the active carbon filter is positioned physically above the electrostatic precipitator. Accordingly, the smoke is introduced upwardly through the successive devices.

Depending on the integration of the roasting apparatus and the smoke treating unit, the control system can be shared between both apparatuses and the steps of the method can be shared between the processing units of at least these two apparatuses.

In one embodiment, the method can be executed by the processing unit of the roasting apparatus and by the processing unit of the smoke treating unit, both processing units communicating together. In particular:

the processing unit of the smoke treating unit can implement the steps of:

monitoring the temperature, observing and comparing the behaviour of the monitored temperature to a predetermined behaviour, if necessary ordering the display of an alarm to the roasting apparatus, the processing unit of the roasting apparatus can implement the steps of:

operating the roasting apparatus in order to produce hot gas, displaying the cleaning alarm.

In another embodiment, the processing unit of the smoke treating unit can implement the steps of:

monitoring the temperature, communicating the values of said monitored temperature to the roasting apparatus, and the processing unit of the roasting apparatus can implement the steps of:

operating the roasting apparatus in order to produce hot gas, observing and comparing the behaviour of the monitored temperature to a predetermined behaviour, if necessary displaying the cleaning alarm.

In another embodiment, the processing unit of the smoke treating unit can implement all the steps, except the operation of the roasting apparatus in order to produce hot gas, after receiving information that said operation is starting from the roasting apparatus.

Preferably, the roasting apparatus can comprise a display unit in order to display the alarm. Alternatively, the smoke treating unit can comprise a device to display the alarm such as a lighting button and/or a sound and/or a voice message.

In another alternative, the control system can be configured to display the alarm on a mobile device in communication with the system.

In a third aspect, there is provided a computer program comprising instructions to cause the system described above to perform the method such as described above.

In one embodiment, the computer program can be executed by the processing unit of the roasting apparatus and by the processing unit of the smoke treating unit, both processing units communicating together. In particular:

the processing unit of the smoke treating unit can implement the steps of:

monitoring the temperature, observing and comparing the behaviour of the monitored temperature to a predetermined behaviour, if necessary ordering the display of an alarm to the roasting apparatus, the processing unit of the roasting apparatus can implement the steps of:

operating the roasting apparatus in order to produce hot gas, displaying the cleaning alarm.

In another embodiment, the processing unit of the smoke treating unit can implement the steps of:

monitoring the temperature, communicating the values of said monitored temperature to the roasting apparatus, and the processing unit of the roasting apparatus can implement the steps of:

operating the roasting apparatus in order to produce hot gas,
observing and comparing the behaviour of the monitored temperature to a predetermined behaviour,
if necessary displaying the cleaning alarm.

In another embodiment, the processing unit of the smoke treating unit can implement all the steps, except the operation of the roasting apparatus in order to produce hot gas, after receiving information that said operation is starting from the roasting apparatus.

In a fourth aspect, there is provided a computer readable storage medium having stored thereon the above computer program.

In the present application, the term "several" means at least two.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

Specific embodiments of the invention are now described further, by way of example, with reference to the following drawings in which.

DETAILED DESCRIPTION OF EXEMPLARY EMBODIMENTS

System for Roasting

Figure 1:
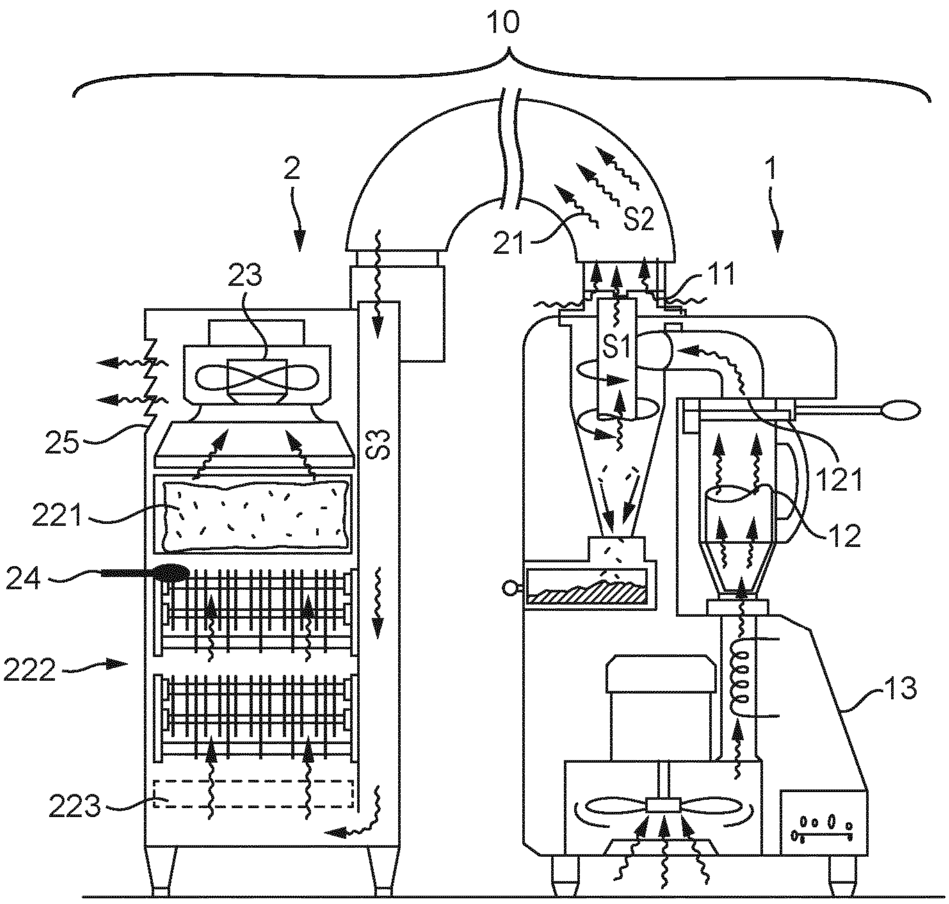
FIGS. 1 and 2 are views of a system according to the present invention illustrating the path of the smoke through the system.

FIG. 1 shows an illustrative view of a system of a roasting apparatus 1 and a smoke treating unit 2. Functionally, the roasting apparatus is operable to roast coffee beans and the smoke treating unit is operable to treat the smoke generated during roasting by the roasting apparatus.

Roasting Apparatus

The roasting apparatus 1 is operable to receive and roast coffee beans inside a roasting chamber 12.

Preferably, the roasting apparatus 1 comprises a roasting chamber 12 in which a flow of hot air is introduced to agitate and heat the beans. The hot air flow is usually produced by an air flow driver and a heater. These devices are positioned below the roasting chamber and introduce the flow of hot air through the bottom of the chamber. In the illustrated figure, the bottom of the chamber is configured to enable air to pass through, specifically it can be a perforated plate on which the beans can lie and through which air can flow upwardly.

The air flow driver is operable to generate a flow of air upwardly in direction of the bottom of the vessel. The generated flow is configured to heat the beans and to agitate and lift the beans. As a result, the beans are homogenously heated. Specifically, the air flow driver can be a fan powered by a motor. Air inlets can be provided inside the base of the housing in order to feed air inside the housing, the air flow driver blowing this air in direction of the chamber 12.

The heater is operable to heat the flow of air generated by the air flow driver. Preferably, the heater is an electrical resistance positioned between the fan and the perforated plate with the result that the flow of air is heated before it enters the chamber 12 to heat and to lift the beans. The heater and/or the fan are operable to apply a roasting profile to the beans, this roasting profile being defined as a curve of temperature against time.

Preferably, the roasting apparatus comprises a user interface 13 enabling:

the input of information about the roasting, in particular the quantity of beans introduced inside the roasting chamber and the desired level of roasting, and the output of information about the roasting operation (status, temperature, time) and
preferably about the output of information about the smoke treating unit 2 in particular about the cleaning of the electrostatic precipitator 222.

The roasting of the beans generates a smoke that is driven to the top opening 121 of the roasting chamber due to the flow of air generated by the air flow driver and as illustrated by arrow S1 in FIG. 1.

Generally a chaff collector is in flow communication with the top opening 121 of the chamber to receive chaffs that have progressively separated from the beans during roasting and due to their light density are blown off to the chaff collector.

The rest of the smoke is evacuated through the smoke outlet 11 at the top of the roasting apparatus.

Smoke Treating Unit

The smoke treating unit 2 is operable to receive and treat the smoke S1 emitted at the smoke outlet 11 of the roasting apparatus.

First, the smoke treating unit 2 comprises a smoke collecting device 21 adapted to collect the smoke. This smoke collecting device 21 or collecting device forms an internal void space or duct guiding the smoke (dotted lines S1, S2, S3) from the outlet 11 of the roasting apparatus in direction of the filtering devices of the smoke filtering sub-unit 22.

In the particularly illustrated embodiment, the smoke filtering sub-unit 22 can comprise:

a device 223 adapted for filtering large particulate matter like PM10, for example a metallic mesh and an associated diffuser, generally a metallic grid positioned in front (that is upstream) of the mesh.
an electrostatic precipitator 222 adapted for filtering small particulate matter,
an active carbon filter 221 adapted to remove VOCs from the smoke.

Preferably, the device for removing particulate matter are positioned upstream the active carbon filter. This upstream position guarantees that particulate matter do not foul the active carbon filter.

Physically, the electrostatic precipitator is positioned below the active carbon filter to avoid that particulates fall from the electrostatic precipitator on the active carbon filter when the electrostatic precipitator is switched off.

The smoke filtering sub-unit 22 comprises a smoke driver 23, generally a fan, for sucking the contaminated smoke from the inlet 211 of the collecting device through the smoke filtering sub-unit 22, where it is treated, to the outlet 25 of the smoke filtering sub-unit 22, where it is dispensed in ambient atmosphere safely.

The smoke filtering sub-unit 22 comprises a temperature sensor 24 positioned just upstream the active carbon filter and configured to measure the temperature of the smoke.

Figure 2A:
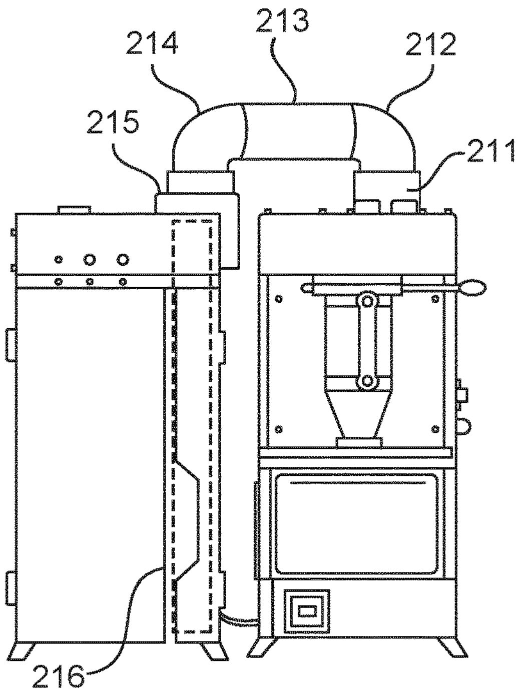

FIG. 2A illustrates more precisely the different sub-parts 211, 212, 213, 214, 215, 216 of collecting device of FIG. 1. When they are assembled, all these sub-parts design the path of the smoke from the outlet 11 of the chamber of the roasting apparatus to the filtering devices 221, 222, 223 of the smoke treating unit. These parts can be dismantled for cleaning and maintenance.

The collecting device comprises different sub parts with different designs and functions, including:

an air inlet device 211. This device enables the connection with the chamber outlet 11 and is provided with lateral openings for the introduction of air and its mixing with smoke of the roaster.

two elbow ducts 212, 214 and straight duct 213, a connecting element 215 with a final duct 216 (dotted lines). This final duct is hidden behind a side panel of the smoke treating unit which made him non visible once the panel is in place. Further to the disassembling of the collecting device and then re-assembling, some parts may be missing such as the smallest connecting elements 211, 215 or the hidden ones like the final duct 216.

Figure 2B:
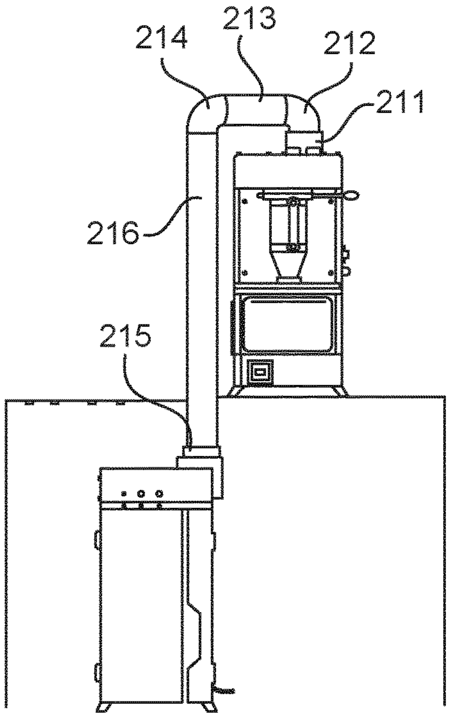

FIG. 2B illustrates an alternative embodiment of the roasting system of FIGS. 1 and 2A, where the roasting apparatus is placed on a counter and the smoke treating unit below said counter. In this configuration, the small connecting device 215 is also hidden below the counter and the operator can forget to re-assemble this part of the collecting device.

Figure 3:
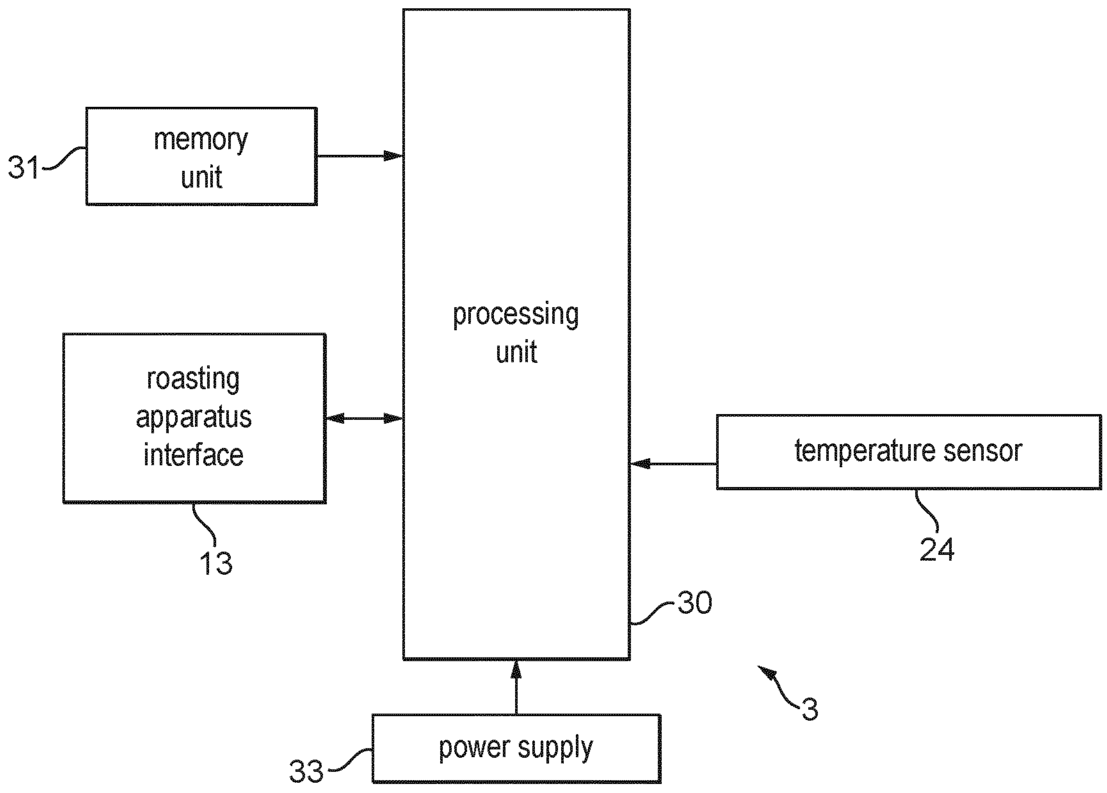
FIG. 3 shows a block diagram of a control system of the system according to FIG. 1.

Control System of the System of the Roasting Apparatus and the Smoke Treating Unit With reference to FIGS. 1, 2 and 3, the control system 3 will now be considered: the control system 3 is operable to control the smoke filtering unit 2.

Depending on the level of integration of the roasting apparatus 1 and the smoke filtering unit 2, the control system can be shared between the processing units of these two apparatuses:

if the smoke treating unit 2 is part of the roasting apparatus 1, usually the processing unit of the roasting apparatus is the master and the processing unit of the filter is the slave.

if the roasting apparatus 1 and the smoke treating unit 2 form two different apparatuses, each of them with its own processing unit, then these processing units can be configured to communicate to implement the method.

FIG. 3 illustrates the control system of the smoke filtering unit 2 of FIG. 1.

The control system 3 typically comprises at a second level of smoke filtering unit 2: a processing unit 30, a power supply 33, a memory unit 31.

The processing unit 30 is configured to output feedback to the user interface 13 of the roasting apparatus in particular to display an alarm related to the detection of the absence of the smoke collecting device. In an alternative configuration, the some treating unit 2 can comprise its own user interface to display this information, for example lighting buttons that can be lighted according to the presence or not of the smoke collecting device.

The processing unit 30 may also display information to the user interface 13 about:

re-installing instructions, reset of the alarm status.

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 20 can be formed as one unit or a plurality of discrete units.

A part of the user interface can also be on a mobile app when the apparatus is provided with a communication interface as described below. In that case at least a part of input and output can be transmitted to the mobile device through the communication interface 32.

The processing unit 30 generally comprises memory, input and output system components arranged as an integrated circuit, typically as a microprocessor or a microcontroller. The processing unit 30 may comprise other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programmed logic or to additionally comprise programmed logic. The processing unit 30 may also comprise one or more of the aforementioned integrated circuits. An example of the later is several integrated circuits arranged in communication with each other in a modular fashion e.g.: a slave integrated circuit to control the smoke treating unit 2 in communication with a master integrated circuit to control the roasting apparatus 10, a slave integrated circuit to control the user interface 13 in communication with a master integrated circuit to control the roasting apparatus 10.

The power supply 33 is operable to supply electrical energy to the said controlled components and the processing unit 30. The power 33 may comprise various means, such as a battery or a unit to receive and condition a main electrical supply.

The processing unit 30 generally comprises a memory unit 31 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic. The instructions stored on the memory unit 31 can be idealised as comprising a program to determine the presence of the active carbon filter in the smoke treating unit of the system and in particular the cleaning status requirement.

The processing unit 30 is configured to output the value of the temperature T measured by the temperature sensor 24.

The control system 3 is operable:

to operate the roasting apparatus in order to produce hot gas, to monitor the temperature of the smoke during said operation, and to observe at least one behaviour of the monitored temperature along time, to compare said at least one observed behaviour of the monitored temperature with a predetermined behaviour of temperature corresponding to the presence of the dismountable smoke collecting device inside the smoke treating unit, to displaying an alarm if the at least one observed behaviour diverges from the corresponding predetermined behaviour.

Preferably, the control system 3 is operable:

to calculate the rate of rise $$R = \frac{dT}{dt}$$

of the monitored temperature at at least one time $t_0$, and to compare said rate to a pre-determined rate of rise $R_0$ associated to that time $t_0$, and if the calculated rate of rise R at time $t_0$ is inferior to the pre-determined rate of rise $R_0$ then to display and alarm.

Figure 4:
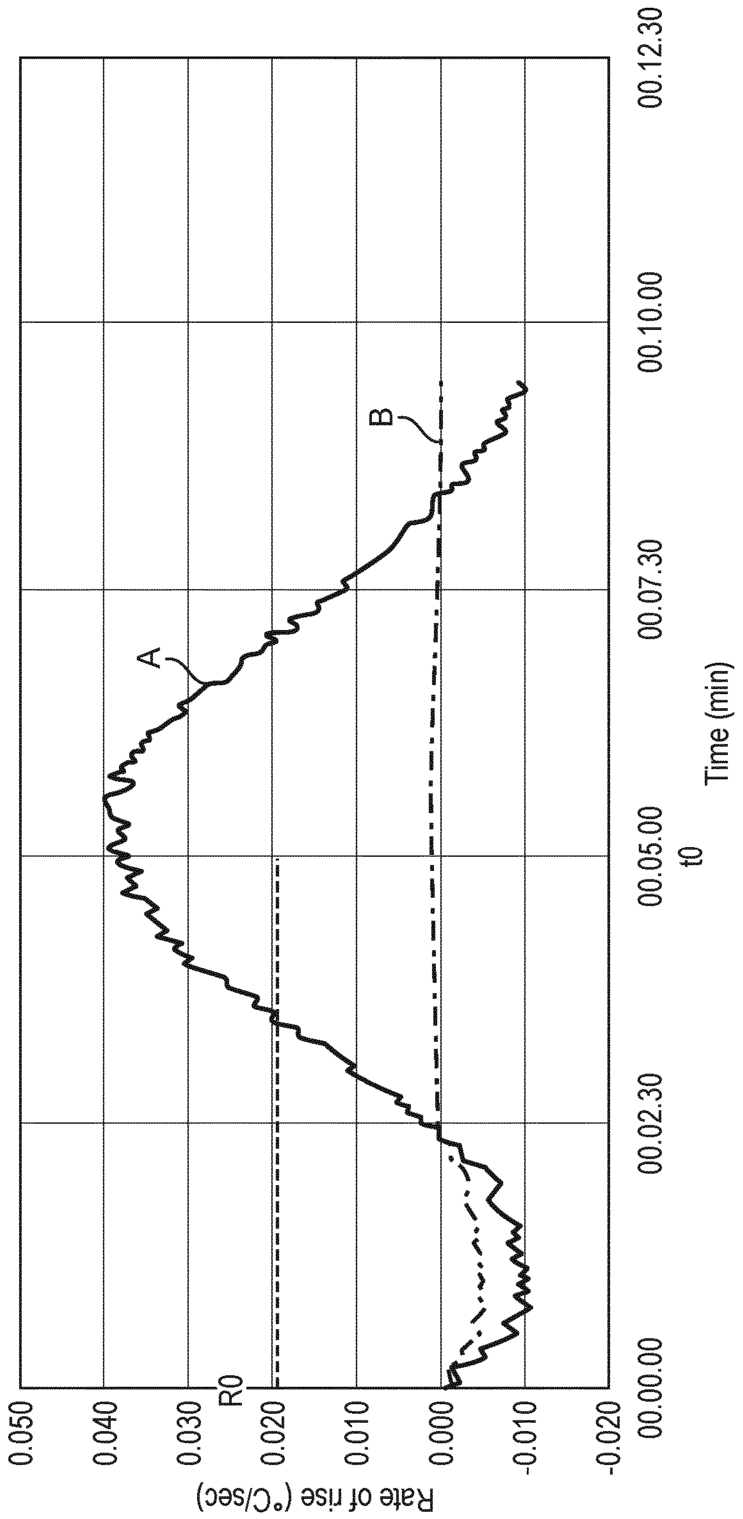
FIG. 4 illustrates the evolution of the rate of rise of temperature with the collecting device present or not.

FIG. 4 illustrates the rates of rise of the temperature measured by the sensor 24 during the first roasting operation implemented after a maintenance operation of the collecting device 21 of the roasting apparatus illustrated in FIGS. 1 and 2A. The beginning of the roasting operation starts at t=0.

In curve A, temperature was measured with the collecting device 21 correctly re-installed inside the smoke treating unit whereas, in curve B, temperature was measured while the sub-part 221 of the collecting device 21 was missing.

At $t_0$=5 minutes, the curve A presents a rate of rise of 0.040° C./sec and it can be observed that, as soon as the roasting operation starts, the temperature rises at the temperature sensor 24 positioned inside the smoke treating unit.

On the contrary, at to =5 minutes, in curve B, the rate of rise remains null.

Accordingly, by setting a pre-determined rate of rise $R_0$ at 0.020° C./sec, the absence of a part of the collecting device can be detected by measuring the rate of rise of temperature inside the smoke treating unit and if the rate of rise is similar to Curve b, an alarm requiring the check of the collecting device is raised.

This threshold is pre-determined through experimentations and, as mentioned above, this pre-determined threshold can be stored in the memory 31 of the control system.

Update of this threshold can be applied if the configuration of the collecting device 21 changes in the roasting system, for example, this threshold would be different with the collecting device 21 of the roasting apparatus illustrated in FIGS. 1 and 2B.

The setup linked to the configuration can be changed either through a manual input through the user interface (either of the system or of a mobile device) or through a remote server and the communication interface 32.

Figure 5:
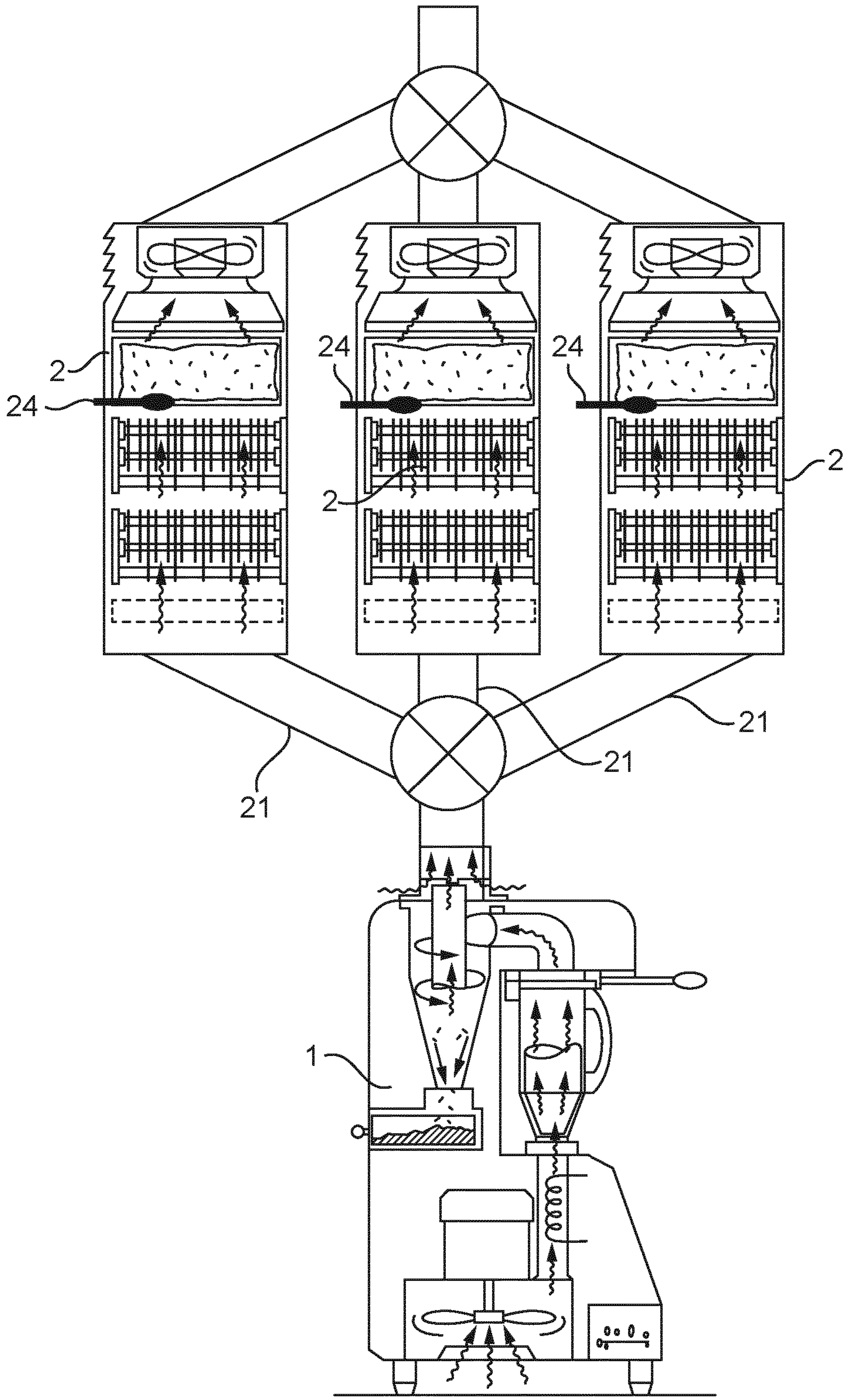
FIG. 5 illustrates a system of one roasting apparatuses and several smoke treating units according to the invention.

FIG. 5 illustrates a system comprising several smoke treating units 3. Such a configuration can be adapted to the treatment of an important volume of smoke, for example due to continuous roasting operations. The smoke outlet of the roasting apparatuses is connected to several connecting devices 21 configured to guide smoke to at least one of the smoke treating units 3. Smoke can be sent to one of the three smoke treating units while the others are on maintenance or cleaned. In each smoke treating unit, the corresponding temperature sensors 24 enables the detection of the missing corresponding collecting device at the inlet of the smoke treating units 3 in a similar manner as in FIG. 1.

Enable

One advantage of the method is that it can be implemented with a temperature sensor that is not specifically dedicated to the implementation of that method. Temperature sensors positioned inside the smoke treating unit for other process controls can be used additionally to provide information about the presence of an essential part of the smoke treating unit after a maintenance operation. An error in re-installation of the collecting device can be detected with existing temperature sensors rather than adding sensors specifically dedicated to the detection of the presence of a part of the collecting device such as a sensor establishing contact with said device (such as a switch contact), an optical sensor, a sensor able to read the field of a magnetic element of the device, an RFID device able to read an RFID tag of the device.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS roasting apparatus 1
smoke outlet 11
roasting chamber 12
top outlet 121
user interface 13
smoke treating unit 2
smoke collecting device 21
sub-parts 211, 212, 213, 214, 215, 216
smoke filtering sub-unit 22
active carbon filter 221
electrostatic precipitator 222
PM filter 223
smoke driver 23
outlet 25
temperature sensor 24
control system 3
processing unit 30
memory unit 31
power supply 33
system 10

The invention claimed is:

1. A method to check smoke of a roasting apparatus of a roasting system, said system comprising:

a roasting apparatus that produces smoke during the heating of coffee beans, and a smoke treating unit configured to treat a flow of smoke produced by the roasting apparatus, said smoke treating unit, comprising:

at least one smoke filtering device, a dismountable smoke collecting device associated with an outlet of the roasting apparatus to guide smoke in a direction the at least one smoke filtering device, at least one temperature sensor positioned to measure a temperature of a flow of the smoke inside the smoke treating unit, and a smoke driver positioned to drive smoke from the roasting apparatus through said smoke treating unit via the dismountable smoke collecting device, wherein, during a roasting operation implemented in the roasting apparatus, the method comprises the steps of:

operating the roasting apparatus in order to produce hot gas, monitoring the temperature of the smoke during the operation, observing at least one observed behaviour of the temperature via a monitored temperature along time, and comparing said at least one observed behaviour of the monitored temperature as collected by the dismountable smoke collecting device and routed to the smoke treating unit during operation inside the smoke treating unit with a predetermined behaviour of temperature to determine if the at least one observed behavior correlates with the predetermined behavior of temperature, wherein if the at least one observed behaviour diverges from the corresponding predetermined behaviour, then displaying an alarm.

2. The method according to claim 1, wherein the step of operating the roasting apparatus in order to produce hot gas is a coffee beans roasting operation, an operation of pre-warming of the roasting apparatus or an operation of checking after an operation of maintenance of the smoke treating unit.

3. The method according to claim 2, wherein the roasting operation implemented in the roasting apparatus is the first operation after a maintenance operation of the dismountable smoke collecting device.

4. The method according to claim 1, wherein the temperature sensor is positioned downstream the collecting device according to the direction of the flow of smoke inside the smoke treating unit.

5. The method according to claim 1, wherein:

the observed behaviour of the monitored temperature is the monitored temperature along time, and the temperature monitored along time at least a time t0 is compared to a pre-determined temperature T0 associated with time t0, wherein if the temperature at time t0 is inferior to the pre-determined temperature T0, then the alarm is displayed.

6. The method according to claim 1, wherein:

the observed behaviour of the monitored temperature is the rate of rise R=dT/dt of the monitored temperature, and the rate of rise R of the monitored temperature is calculated at at least one time t0 and compared to a pre-determined rate of rise R0 associated to that time t0, wherein if the calculated rate of rise R at time t0 is inferior to the pre-determined rate of rise R0 then the alarm is displayed.

7. The method according to the claim 6, wherein the time t0 for calculation of the rate of rise is set before the first crack of the beans happen.

8. The method according to claim 1, wherein the dismountable smoke collecting device of the smoke treating unit comprises several dismountable sub-elements, these sub-elements forming the collecting device when assembled together.

9. The method according to claim 1, wherein the system comprises:

several smoke treating units, each of said smoke treating units being configured to conduct and treat at least a part of the smoke through a dedicated path, and an inlet ducting device to guide smoke emitted by the roasting apparatus to at least one of the smoke treating units.

10. The method according to claim 1, wherein the system comprises:

several roasting apparatuses, and the smoke treating unit adapted to treat the multiple flows of the smoke produced by said several roasting apparatuses, said smoke treating unit comprising several dismountable smoke collecting devices, each of dismountable smoke collecting device being configured to collect smoke from the outlet of one respective roasting apparatus.

11. The method according to claim 10, wherein the method comprises the additional steps of:

obtaining information relative to a number of operated roasters, obtaining the predetermined behaviour of temperature corresponding to the presence of all the dismountable smoke collecting devices between said obtained number of operated roasters and the smoke treating unit, and comparing the observed behaviour of the monitored temperature with the obtained predetermined behaviour of temperature corresponding to the presence of all the dismountable smoke collecting devices.

12. The method according to claim 1, wherein dismountable smoke collecting device includes an internal void space or ducting to guide the smoke form the outlet of the roasting apparatus in a direction of he filtering device.

* * * * *